United States Patent Office 2,852,513
Patented Sept. 16, 1958

2,852,513

THIOPHOSPHORIC ACID ESTERS AND THEIR PRODUCTION

Gerhard Schrader, Wuppertal-Cronenberg, and August Dörken, Wuppertal-Sonnborn, Germany, assignors to Farbenfabriken Bayer Aktiengesellschaft, Leverkusen, Germany, a corporation of Germany No Drawing. Application April 17, 1957
Serial No. 653,274

Claims priority, application Germany April 27, 1956

4 Claims. (Cl. 260—247.1)

The present invention relates to and has as its object new and useful thiophosphoric acid esters as well as their preparation. Generally, these esters may be represented by the following formula:

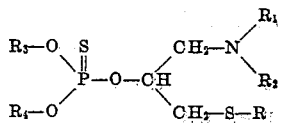

in which R stands for any aliphatic or aromatic radicals, $R_1$ and $R_2$ stand for lower aliphatic radicals (together with N, $R_1$ and $R_2$ may also form a cyclic amine which furthermore may contain hetero-atoms, thus yielding a pyrrolidine-, piperidine-, morpholine-, piperazine ring or the like), $R_3$ and $R_4$ stand for aliphatic radicals especially lower aliphatic radicals having from 1–4 carbon atoms.

Thiophosphoric acid trialkyl esters which contain in one of their alkyl groups a mercapto alkyl substituent have become known as very effective insecticides during the last years. An outstanding representative of this class is for example demetone, what is O.O-diethyl-O-ethyl mercapto ethyl thionophosphate.

It has now been found that excellent insecticides of the above shown formula may be obtained by reacting O.O-dialkyl thionophosphoric acid halides with 1-(substituted amino)-3-(substituted mercapto)-2-hydroxy propanes. For better explanation this reaction may be seen from the following scheme using 1-(dimethyl-amino)-3-(ethyl-mercapto)-2-hydroxy propane and O.O-diethyl thiophosphoric acid chloride as reactants:

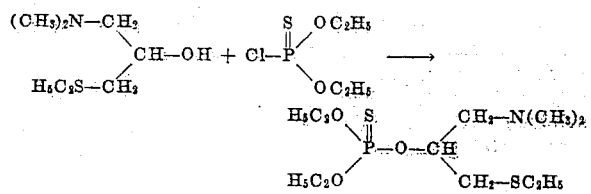

It has to be understood, however, that also other O.O-dialkyl thiophosphoric acid halides such as the bromides may successfully be used for completing this reaction. Other dialkyl esters include especially the dimethyl, diisopropyl, di-n-propyl and dibutyl phosphoric acid ester halides. As examples of appropriate substituted 2-hydroxy propanes there may be mentioned such compounds which contain in 1-position instead of a dimethyl amino group a diethyl, diisopropyl, dibutyl amino radical, a pyrrolidino, pyrimidino, piperazino, morpholino, thiamorpholino radical and the like. Instead of the ethyl mercapto groups in said compounds there may be present also a methyl-mercapto, phenyl-mercapto, p-chlorophenyl-mercapto, p-nitrophenyl-mercapto group and the like.

The reaction generally is carried out in inert organic solvents such as benzene, toluene, xylene and the like in the presence of an appropriate acid binding agent such as an alkali metal hydroxide, carbonate or an organic amine such as diethyl amine and the like. Sometimes, the addition of a small amount of copper powder to the reaction mixture may be advantageous for obtaining better results. Usually the reaction temperature has to be between about room temperature and 100° C. especially between about 60–70° C.

The preparation of the starting materials is known from the literature or proceeds in an analogous manner to well known reactions. Thus the reaction of epichlorohydrine with mercaptane is known from Nenitzescu and Scarlatescu, Berichte der deutschen chemischen Gesellschaft, vol. 68, page 587 (1935), or from Pollard and Rietz, J. Am. Chem. Soc., vol. 72, page 4000 (1950). The further reaction of the mercapto-propylene-oxides with appropriate amines also proceeds according to known methods and is described e. g. in J. Am. Chem. Soc., vol. 71, page 1478 (1949) from Gilman and Fullhart. If some starting materials are not described in the above said literature, then their preparation proceeds exactly to the methods described there and using only the corresponding molecular amounts of starting materials without changing the reaction conditions.

The compounds of the present invention are generally valuable insecticides and plant-protecting agents. They kill pests such as aphids, flies and mites and exhibit a very remarkable systemic action. The application of these compounds should be carried out according to the use of other known phosphor insecticides, i. e. in dilution of solution with solid or liquid carriers such as chalk, talc, bentonite, water, alcohols, liquid hydrocarbons, etc. The inventive compounds may further be used in combination with other known insecticides or pesticides, etc. Effective concentrations of the compounds may vary also; generally, concentrations of 0.0001% to 1.0% kill pests effectively. The combinations of the compounds may be sprayed or dusted or otherwise brought in contact with pests or plants to be protected. They may also be used as aerosol. The compounds of the present invention are of special advantage for combating sucking insects such as caterpillars. They exhibit also a very remarkable acaricidal activity. Furthermore, they may be used especially for combating mosquito larvae.

As a special example for the utility of the inventive compounds O-(2-[phenyl-mercapto]-1-[dimethylamino methyl] - ethyl) - O.O-diethyl thionophosphate is dissolved in the same amount of acetone. After the addition of 30% by weight of benzyl hydroxy diphenyl polyglycol ether (having 15 glycol radicals in the chain) this solution is diluted with water to a concentration of active ingredient indicated in the table below. The activities are the following ones:

| | |
|---|---|
| Mosquitos | 0.00001 |
| Mosquito larvae | 0.0000001 |
| Spider mites | 0.001 |
| Systemic action on caterpillars | 0.1 |

*Example 1*

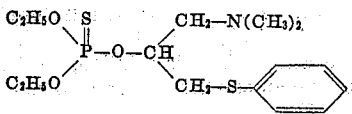

44.5 grams of a thiopropanol derivative of the following formula

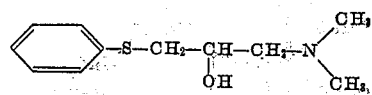

(prepared from phenyl-thiopropyleneoxide and dimethylamine, boiling point 0.01 mm./90 to 91° C.) are dissolved in 50 cc. benzene. There are added 34 grams finely powdered dry potassium carbonate and 1.5 grams powdered copper. While stirring there are added within 10 minutes at a temperature of about 60° C. 40 grams diethylthionophosphoric acid chloride. The mixture is stirred for 5 to 7 hours and then the salts are filtered off with suction. The filtrate is shaken thoroughly with a 10% soda solution. The benzene solution is separated and dried with sodium sulphate. The solvent is removed by distillation in vacuo. 45 grams of the new ester remain as a brown oil, which cannot be distilled even in high vacuo. Yield: 61.5 of the theoretical.

LD$_{95}$ on rats orally 100 mg./kg. In a concentration of 1:10,000 the new ester kills flies, and in a concentration of 1:1,000,000 the new ester is effective against mosquito larvae. 0.001% solutions kill spider mites completely and 0.1% solutions show remarkable systemical effect on caterpillars.

*Example 2*

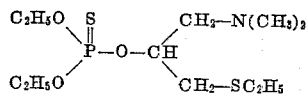

33 grams of a thiopropanol derivative of the following formula

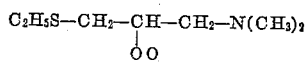

(prepared from ethylmercapto-propyleneoxide and dimethylamine; boiling point 0.01 mm./34°) are dissolved in 17 grams pyridine. There are added 30 grams diethylthionophosphoric acid chloride at a temperature of about 30° C. The reaction mixture is stirred for further 14 hours at the same temperature and then it is poured into ice water, which has been acidified with 20 ml. diluted hydrochloric acid. The precipitated oil is taken up in ether and shaken thoroughly with 10% soda solution. Then the etherical layer is separated and dried over sodium sulphate and the ether is removed by distillation in vacuo. There remain 20 grams of yellow coloured water-unsoluble oil, which cannot be distilled even in high vacuo. The new ester obtained shows an LD$_{95}$ on rats orally of 50 mk./kg. 0.01% solutions kill black bean aphids completely. Spider mites can effectively be combated with a 0.01% solution. The compound has a remarkable systemical effect against caterpillars and plants which are sprayed or dusted with a 0.1% solution or extensions are protected against them.

*Example 3*

48 grams of a thiopropanol derivitive of the formula

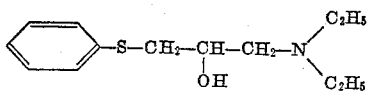

(prepared from phenyl-thiopropylene-oxide and diethylamine, boiling point 0.01/88–89° C.) are dissolved in 60 cc. toluene. There are added 34 grams of a finely powdered dry potassium carbonate and 1.5 grams of powdered copper. While stirring there are added within 10 minutes at a temperature of about 65° C. 40 grams diethylthionophosphoric acid chloride. The mixture is stirred for further 7 hours at a temperature of 65–70° C. and the residue is filtered off with suction. The filtrate is shaken with 10% soda solution, the toluene layer is dried over sodium sulphate and the solvent is distilled off in vacuo. There remain 59 grams of the new ester of the formula

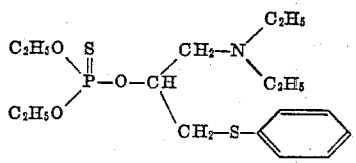

as a brown oil, which cannot be distilled even in high vacuo. Yield: 73% of the theoretical.

*Analysis.*—Cal.: P=7.91%; S=16.4%; N=3.56%. Found: P=7.71%; S=16.8%; N=3.25%.

*Example 4*

43 grams of a thiopropanol derivative of the formula

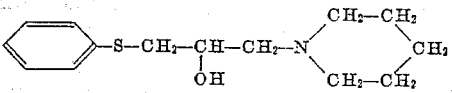

(prepared from phenyl-thiopropylene-oxide and piperidine, boiling point 0.01/115–116° C.) are dissolved in 90 cc. toluene. There are added 28.5 grams finely powdered dry potassium carbonate and 1 gram powdered copper. While stirring there are added within 5 minutes at a temperature of about 60° C. 34 grams diethylthionophosphoric acid chloride. The mixture is stirred for further 6–7 hours and the residue is filtered off with suction. The filtrate is shaken with 10% soda solution and afterwards with diluted ammonia and the layers then are separated. After drying the toluene solution over sodium sulphate and clearing with carbon black the toluene is distilled off in vacuo. There are obtained 44 grams of the new ester of the following formula

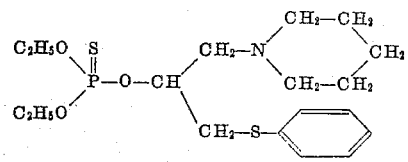

as a clear, light red-brown oil, which cannot be distilled even in vacuo. Yield: 65% of the theoretical.

*Analysis.*—Cal.: P=7.7%; S=15.90%; N=3.42%. Found: P=7.9%; S=16.27%; N=3.14%.

*Example 5*

42.8 grams of a thiopropanol derivative of the formula

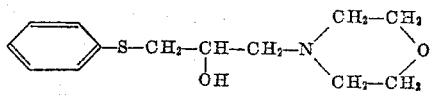

(prepared from phenyl-thiopropylene-oxide and morpholine, boiling point 0.01/119–120° C.) are dissolved in 100 cc. toluene. There are added 28.5 grams finely powdered dry potassium carbonate and 1 gram powdered copper. While stirring there are added within 10 minutes at a temperature of about 65° C. 34 grams diethylthionophosphoric acid chloride. The mixture is stirred for further 6 hours at a temperature of about 70° C. and the residue is filtered off with suction. The filtrate is shaken with aqueous diluted ammonia, the layers are separated and the toluene solution is dried over sodium sulphate. After distilling off the toluene in vacuo there remain 50.2 grams of the new ester of the formula

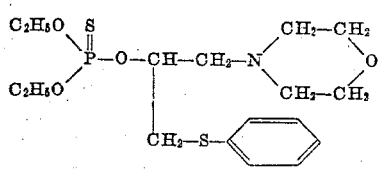

as a yellow oil, which cannot be distilled even in high vacuo. Yield: 74% of the theoretical.

*Analysis.*—Cal.: P=7.64%; S=15.78%; N=3.45%. Found: P=7.53%; S=15.64%; N=3.38%.

What we claim is:

1. A thiophosphoric acid of the formula

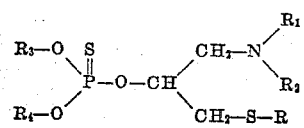

in which R stands for a member selected from the group consisting of lower alkyl groups and phenyl radicals

stands for a member selected from the group consisting of di-lower-alkylamino, piperidino and morpholino radicals, $R_3$ and $R_4$ stand for a member selected from the group consisting of aliphatic radicals having from 1–4 carbon atoms.

2. The process for making a thiophosphoric acid of the formula

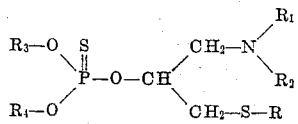

in which R stands for a member selected from the group consisting of lower alkyl groups and phenyl radicals,

stands for a member selected from the group consisting of di-lower alkylamino, piperidino and morpholino radicals, $R_3$ and $R_4$ stand for a member selected from the group consisting of aliphatic radicals having from 1–4 carbon atoms, which comprises reacting an O,O-di-lower alkyl thionophosphoric acid halide with a 2-hydroxy propane of the formula

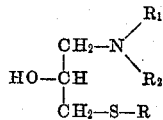

wherein R stands for a member selected from the group consisting of lower alkyl groups and phenyl radicals, and

stands for a member selected from the group consisting of di-lower-alkylamino groups and heterocyclic mononuclear radicals at a temperature between about room temperature and 100° C.

3. The process of claim 2 wherein the temperature is between about 60° C. and 70° C.

4. The process of claim 2 wherein the reaction is carried out in the presence of an acid binding agent.

No references cited.